(12) United States Patent
Stofberg et al.

(10) Patent No.: US 10,820,463 B1
(45) Date of Patent: Nov. 3, 2020

(54) EARTH CUTTING APPARATUS, SYSTEM AND METHOD

(71) Applicant: AGRIREVOLUTION, Cape Town (ZA)

(72) Inventors: Jacobus du Toit Stofberg, Cape Town (ZA); Lodewyk Christoffel De Lange, Western Cape (ZA)

(73) Assignee: Agrirevolution, Cape Town (ZA)

( * ) Notice: Subject to any disclaimer, the term of this patent is extended or adjusted under 35 U.S.C. 154(b) by 0 days.

(21) Appl. No.: 16/764,970

(22) PCT Filed: Nov. 16, 2018

(86) PCT No.: PCT/IB2018/059040
§ 371 (c)(1),
(2) Date: May 18, 2020

(87) PCT Pub. No.: WO2019/097468
PCT Pub. Date: May 23, 2019

(30) Foreign Application Priority Data

Nov. 17, 2017 (ZA) .................................. 2017/07797

(51) Int. Cl.
*A01B 33/10* (2006.01)
*A01B 77/00* (2006.01)
(Continued)

(52) U.S. Cl.
CPC ................ *A01B 33/10* (2013.01); *A01B 9/00* (2013.01); *A01B 13/08* (2013.01); *A01B 33/021* (2013.01); *A01B 35/28* (2013.01)

(58) Field of Classification Search
CPC ......... A01B 33/10; A01B 33/021; A01B 9/00; A01B 13/08; A01B 13/10; A01B 35/28;
(Continued)

(56) References Cited

U.S. PATENT DOCUMENTS 508,959 A    11/1893   Miskovsky
729,654 A    6/1903   Parker
(Continued)

FOREIGN PATENT DOCUMENTS

CN    106508147 A    3/2017
DE    2849886 A1    5/1980
(Continued)

OTHER PUBLICATIONS

International Search Report and Written Opinion for PCT/IB2018/059040, dated Feb. 5, 2019 (9 pages).

*Primary Examiner* — Robert E Pezzuto
(74) *Attorney, Agent, or Firm* — Quarles & Brady LLP

(57) ABSTRACT

An earth cutting apparatus comprising a plurality of articulated elements including at least a first element having a mounting structure thereon and an adjacent second element hingedly connected to the first element. An earth cutting member is provided including a proximal end which is pivotally mounted to the mounting structure of the first element and an earth cutting end. The earth cutting member is slidably connected to the adjacent second element and moveable between an extended position and a retracted position, such that hinged movement of the adjacent second element relative to the first element causes the earth cutting member to slidably extend from the adjacent second element to the extended position for operatively cutting earth. Hinged movement of the adjacent second element in an opposite direction causes the earth cutting member to slidably retract to the retracted position.

15 Claims, 14 Drawing Sheets

(51) Int. Cl.
  *A01B 9/00*   (2006.01)
  *A01B 33/02*  (2006.01)
  *A01B 35/28*  (2006.01)
  *A01B 13/08*  (2006.01)

(58) Field of Classification Search
  CPC . A01B 43/00; A01B 77/00; E02F 3/08; E02F 3/083; E02F 3/144; E02F 3/145; E02F 3/088; E02F 3/085; E02F 5/16
  USPC ...... 171/11, 15, 64; 172/1, 32, 33, 112, 123; 299/7, 11; 37/303, 452, 357, 360, 365, 37/356
  See application file for complete search history.

(56) References Cited

U.S. PATENT DOCUMENTS

| | | | | |
|---|---|---|---|---|
| 1,740,923 | A | * 12/1929 | Jaeger | E02F 3/083 37/357 |
| 1,856,216 | A | * 5/1932 | Jaeger | E02F 5/06 37/357 |
| 4,005,755 | A | 2/1977 | Bakke et al. | |
| 8,176,662 | B2 | * 5/2012 | Peterson | E02F 3/144 37/360 |
| 10,492,362 | B2 | * 12/2019 | Albaek | A01B 45/026 |

FOREIGN PATENT DOCUMENTS

| | | |
|---|---|---|
| DE | 4413289 A1 | 10/1995 |
| GB | 820363 A | 9/1959 |

\* cited by examiner

EARTH CUTTING APPARATUS, SYSTEM AND METHOD

CROSS-REFERENCE TO RELATED APPLICATIONS

This application is a U.S. National Stage application, filed pursuant to 35 U.S.C. § 371, of International Application No. PCT/IB2018/059040, filed on 16 Nov. 2018, which claims priority from South African provisional patent application number 2017/07797, filed on 17 Nov. 2017, which are each incorporated by reference herein in their entirety.

FIELD OF THE INVENTION

This invention relates to earth cutting, an earth cutting apparatus, an earth cutting system and an earth cutting method.

More particularly, but not exclusively, this invention relates to deep working of earth or soil for preparation and treatment of the soil for agricultural use.

BACKGROUND TO THE INVENTION

The tilling or ploughing of soil for agricultural purposes involves various techniques and equipment, many of age-old origin. These techniques and equipment have evolved in modern times to include a wide variety, or sets, of working tools such as ploughs and rippers of various design and construction and additional working tools such as shears and toes which work through the soil. These ploughs and rippers are dragged through the soil by driving systems, such as tractors. There are many possible combinations of driving systems and the various working tools, each with a specific application in agriculture. Some of these devices are specialised so as to create soil conditions suitable for the cultivation of a specific annual or perennial crop.

Traditionally, these ploughing or tilling systems are used to loosen the soil to a certain depth and to allow for root development and the penetration of water and nutrients, into the soil. Water and nutrients are generally introduced on a top surface of the soil.

These ploughing and tilling systems have become more sophisticated over time and have been developed to penetrate the soil to greater depths while also achieving a wider reach. Thus, the effectiveness of soil loosening and turning as well as the effectiveness of introducing various substances including fertilizers into the soil have been improved over time, however these improvements were of limited extent.

A measure of the efficacy of a ploughing or tilling system is a required pulling or pushing force (also referred to as a draft force) used while tilling an area of soil. This required pulling or pushing force is affected by factors such as increased soil compaction which, in turn, results in increased soil strength and bulk density. Soil compaction and thus bulk density increase with increasing depth below the soil surface, which results in:
- An increase in the amount of energy input required for tilling;
- An impediment in the growth of plant roots particularly at low moisture levels;
- Reduced water penetration and reduced moisture retention capacity of the soil;
- Diminished void spaces for holding adequate water-air-nutrient mixtures; and
- A reduction in the magnitude of soil pore sizes due to the increased soil bulk density, which depraves crops of water and nutrients.

Even in conservation tillage systems, including minimum or no-till practices, the negative effects of compaction may accumulate over time. These negative effects may occur even in virgin soils.

A problem encountered in the field is that the amount of energy needed to provide the draft, pulling or pushing force required by conventional tillage implements increases at a rate greater than a proportionate increase in tilling depth. This has the effect of limiting deep tilling as a result of increased operating costs and also increased wear on tilling equipment. The effectiveness and efficiency of a tilling system is determined by the design of the working tool set used to cut through the soil including shears or blades of a plough, in the case of ploughing and the toes or tips of a ripper in the case of ripping the soil.

Conventional tilling, invariably using narrow tilling tools, relies on a three-dimensional mode of soil-zone failing in front of the tool as well as at its sides. A critical depth of 600 mm has been postulated for this mode. Changing and improving soil-failure by increasing the working-depth to tool-width ratio and/or working below the critical depth has the effect of requiring increased draft, pulling or pushing forces. These increased pulling or pushing forces have the result that the power needed increases exponentially. However, a side effect of working below the critical depth is a reduction in soil disturbance with an increase in soil compaction.

Increasing environmental awareness of industrial and mining operations and the impact of their activities, including the pollution of the soil, have also raised an increasing need for the rehabilitation and remediation of soils thus polluted. To achieve soil conditions which will be useable for agricultural, forestry or environmental purposes as well as ecological interactions which do not tolerate any form of pollution often requires the soil be penetrated and moved to depths greater than normally required by agriculture, while soil ameliorants and amendments are introduced at the same time. The known devices, systems and methods are not able to perform tilling beyond the critical depth.

Accordingly, a need exists for an apparatus designed and built for deep working of soil or earth. There is also scope to address the aforementioned disadvantages and problems, or at least to provide a useful alternative to the known devices, systems and methods.

The preceding discussion of the background to the invention is intended only to facilitate an understanding of the present invention. It should be appreciated that the discussion is not an acknowledgment or admission that any of the material referred to was part of the common general knowledge in the art as at the priority date of the application.

SUMMARY OF THE INVENTION

In accordance with an aspect of the invention there is provided an earth cutting apparatus comprising:
  a plurality of articulated elements including at least a first element having a mounting structure thereon and an adjacent second element hingedly connected to the first element; and
  an earth cutting member including a proximal end which is pivotally mounted to the mounting structure of the first element and an earth cutting end, the earth cutting member being slidably connected to the adjacent second element and moveable between a retracted position and an extended position, such that hinged movement of the adjacent second element relative to the first element causes the earth cutting member to slidably extend from the adjacent second element to the extended position for operatively cutting earth, and hinged movement of the adjacent second element in an opposite direction causes the earth cutting member to slidably retract to the retracted position.

Further features provide for the first and second elements to be in the form of articulated plates; for the first and second elements to form part of an articulated band of plates or elements having a plurality of first and second elements arranged adjacent one another; for the articulated band of elements to be provided around an idler wheel and a driver wheel for rotating the band of elements in use; for a plurality of earth cutting members to be provided on the band of elements; and for the earth cutting members to be configured to move between their extended and retracted positions as the band of elements moves around the driver and idler wheels in use.

Still further features provide for the earth cutting member to be configured to receive an earth cutting bit; for the earth cutting bit to be removably mountable to the earth cutting member at the earth engaging end thereof; for the earth cutting bit to be in the form of a conical or flat bit for engaging and cutting the earth as the band of elements is rotated.

Yet further features provide for the adjacent second element to include a swivel wherein the earth cutting member is slidably mounted; for the slideable connection between the earth cutting member and the adjacent second element to be configured to clean the earth cutting member as it moves between its extended and retracted positions; and for the swivel to be configured to facilitate cleaning of the earth cutting member.

Further features provide for the earth cutting apparatus to be configured such that hinged movement of the first and second elements causes reciprocating movement of the earth cutting member; and for the reciprocating movement to be caused when the first and second elements move around the idler wheel or the driver wheel.

In accordance with another aspect of the invention there is provided an earth cutting system comprising:

a band of articulated elements including at least a first element and an adjacent second element hingedly connected to the first element, the band of articulated elements being provided around an idler wheel and a driver wheel for rotating the band of elements in use; and at least one earth cutting member including a proximal end and an earth engaging end, the earth cutting member being slidably connected to one of the first and second elements and moveable between a retracted position and an extended position, such that when the band is rotated, the earth cutting member moves to its extended position when it is at a first location relative to the idler wheel for operatively cutting earth, and moves to its retracted position when it is at a second location relative to the idler wheel.

Further features provide for the system to include a power source for providing power to drive the driver wheel; fort the system to include a secondary drum; for the secondary drum to be provided adjacent the driver wheel; for the secondary drum to be rotatable in the same or in an opposite direction than the driver wheel; for a plurality of teeth or projections or paddles or brushes to be provided on the secondary drum; for the plurality of projections to be arranged to interpose the earth cutting members in use, thereby facilitating cleaning of the earth cutting members; for the secondary drum to be smaller than the driver wheel, preferably having a radius which may be in the range of 20% to 40% of that of the driver wheel; and for the secondary drum to be configured to rotate at an effective speed of at least twice that of the driver wheel, the effective speed being measured at an outer edge of the driver wheel or the secondary drum.

Still further features provide for the system to be provided on a vehicle for cutting or tilling earth in a tilling direction; for the vehicle to be configured to till the earth by pushing the idler wheel into the earth, thereby causing the earth cutting members to cut the earth; for the band of elements to be rotatable with a first portion of the band moving toward the tilling direction and a second portion of the band moving in a direction away from the tilling direction; for the first portion of the band which is moving toward the tilling direction to be a lower portion of the band and for the band to be arranged to cut or till the earth when the earth cutting members are moving around the idler wheel in an upward direction; for the earth cutting members to be self-sharpening such that rotation of the idler wheel causes the earth cutting members to be sharpened as they cut through earth; and for the earth cutting members to be configured to perform an upward cutting action on the earth.

Yet further features provide for the vehicle to include an adjustable support which is configured: to raise or lower the idler wheel into the soil to vary a working depth thereof; and to vary the integration or interaction or the distance between the driver wheel and the secondary drum.

Further features provide for a drive shaft to be provided for driving the driver wheel; for the driver wheel to be in the form of a sprocket for driving the band of elements, alternatively for one or more sprockets to be provided to drive the band of elements.

Still further features provide for the earth cutting members each to be configured to receive an earth cutting bit; for the earth cutting bit to be removably mountable to the earth cutting member at the earth engaging end thereof; for the earth cutting bit to be in the form of a conical or flat bit for engaging and cutting the earth as the band of elements is rotated; for the plurality of earth cutting bits to be configured for operatively penetrating, working, cutting or moving the earth or soil; and for the plurality of earth cutting bits and the earth engaging members and other components of the system to be replaceable.

Yet further features provide for the adjacent second element to include a swivel whereto each earth cutting member is slidably mounted; for the slideable connection between the earth cutting member and the adjacent second element to be provided by the swivel; and for the swivel or the slideable connection to be configured to clean the earth cutting member as it moves between its extended and retracted positions.

Further features provide for the system to also include a plurality of earth cutting bits mounted directly to the band of elements.

Still further features provide for the band of elements to be configured such that hinged movement of the first and second elements causes reciprocating movement of the earth cutting member;

and for the reciprocating movement to be caused when the first and second elements move around the idler wheel or the driver wheel.

Yet further features provide for the diameter of the idler wheel to be less than 80% of the diameter of the driver wheel; and for a diameter ratio of at least 5:4 to be provided between the driver wheel and the idler wheel.

In accordance with another aspect of the invention there is provided an earth cutting method comprising:

rotating a band of articulated elements including at least a first element and an adjacent second element hingedly connected to the first element, the band of articulated elements being provided around an idler wheel and a driver wheel for rotating the band of elements;

utilising at least one earth cutting member including a proximal end and an earth engaging end, the earth cutting member being slidably connected to one of the first and second elements and moveable between a retracted position and an extended position, such that when the band is rotated, the earth cutting member moves to its extended position when it is at a first location relative to the idler wheel for operatively cutting earth, and moves to its retracted position when it is at a second location relative to the idler wheel; and cutting earth by utilising a power source to drive the driver wheel to operatively rotate the band of elements around the idler wheel.

Further features provide for the method to further include: lifting cut earth with the band of elements; mixing a substance or material with the cut earth; and depositing the mixture onto a surface of the earth which is being cut or worked.

Still further features provide for the method to include providing a mixing chamber for mixing the material with the cut earth; for the mixing to include injecting or introducing a gas or a liquid or any other material into the cut earth.

An embodiment of the invention will now be described, by way of example only, with reference to the accompanying drawings.

DETAILED DESCRIPTION WITH REFERENCE TO THE DRAWINGS

Deep working of the soil is sometimes referred to in the art as "soil deep working" (SDVV). SDW as referred to in this specification, and the working tool sets designed and used to penetrate and work through the soil, refers to processes which may take place at depths greater than those possible with conventional ploughing or tilling tools.

There is disclosed a soil working apparatus, a soil working system and a soil working method. The soil working system includes a plurality of grousers or plates that are arranged in a chain rotatable with an engine or electric motor around a power transferring member or driver wheel and a freely rotating member or idler wheel. Hydraulics or another moving mechanism may be provided for lowering the earth working system into the ground or soil to work the ground at depths greater than 600 millimetres. The earth working apparatus or swivel-slide cutting tool may be provided on two successive plates of the chain of plates and may be configured to convert rotary motion of the plates into linear motion of an earth working member of the earth working apparatus to cause the earth working member to rip, pick or perforate the soil when it is moved through the ground. The soil working apparatus and the soil working system may be provided on a vehicle such as a wheeled or tracked vehicle for conveying the soil working system as it is used to work or prepare the soil.

Figure 3:
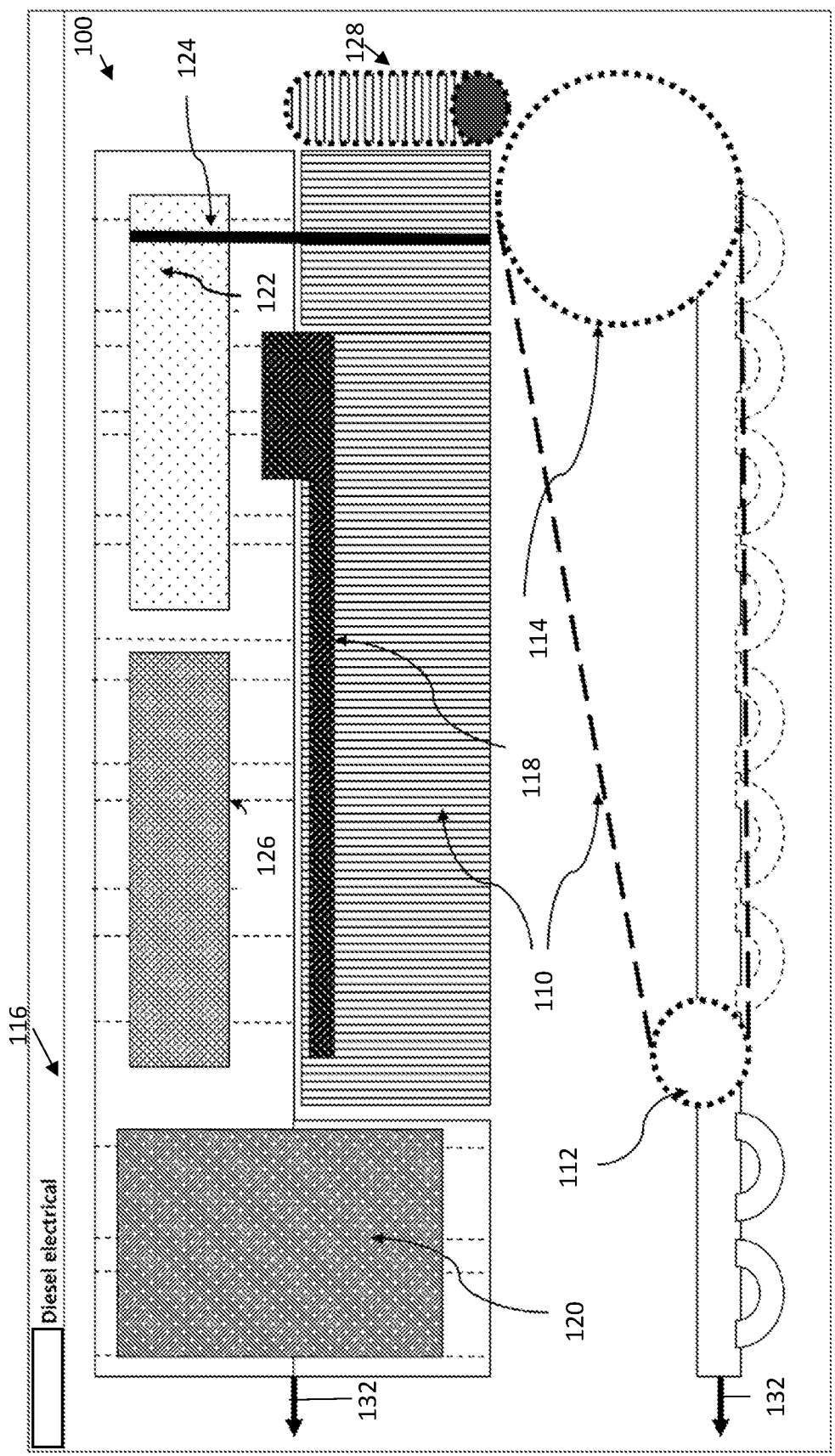
FIG. 3 is a diagrammatic representation showing a side and top view of the exemplary earth working machine including the power source, a torque converting system and a shaft for driving the driver wheel.
Figure 4:
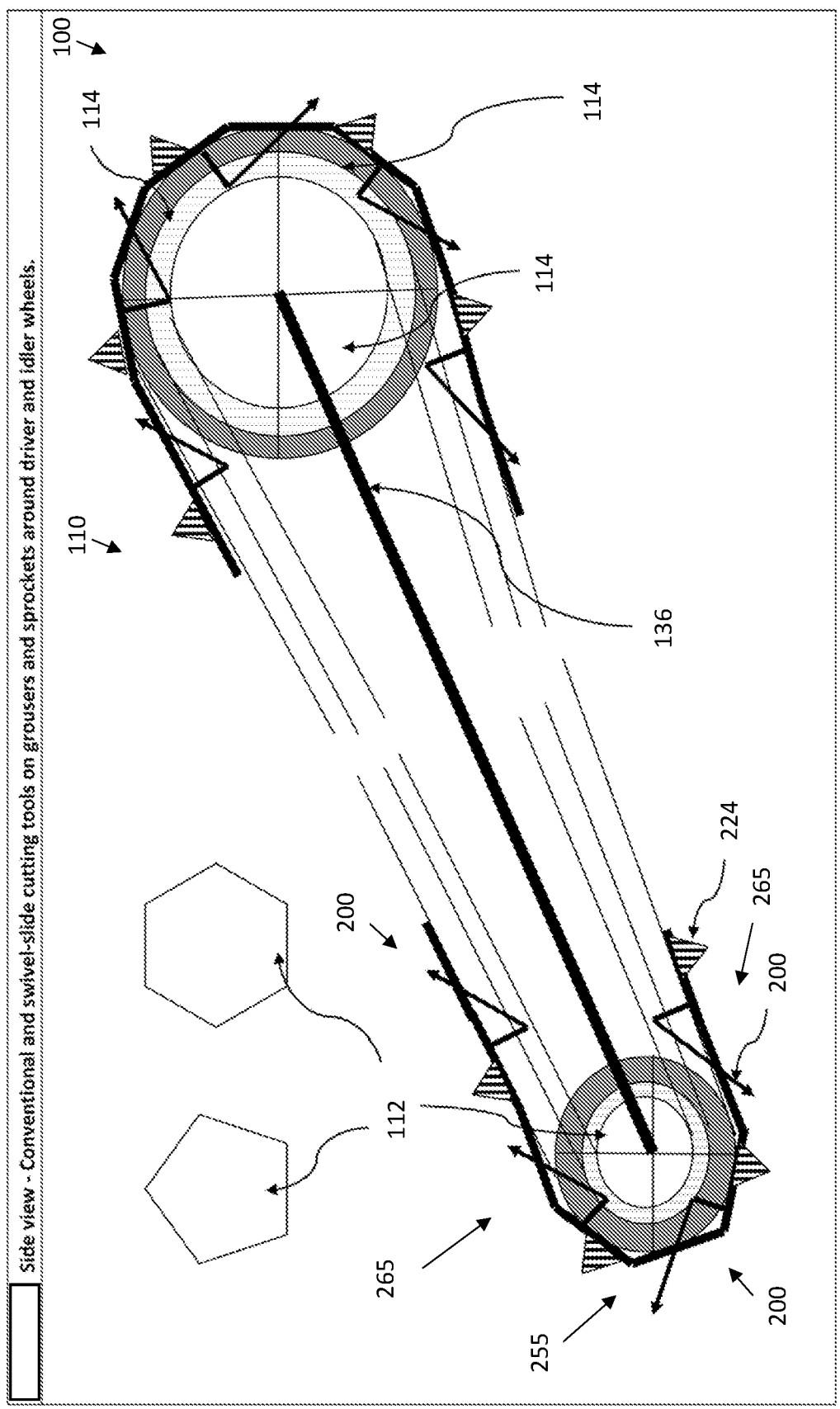
FIG. 4 is a is a diagrammatic representation showing a sectional side view of the band of elements provided around the driver wheel and the idler wheel and illustrating a plurality of earth cutting members provided on the band.
Figure 5:
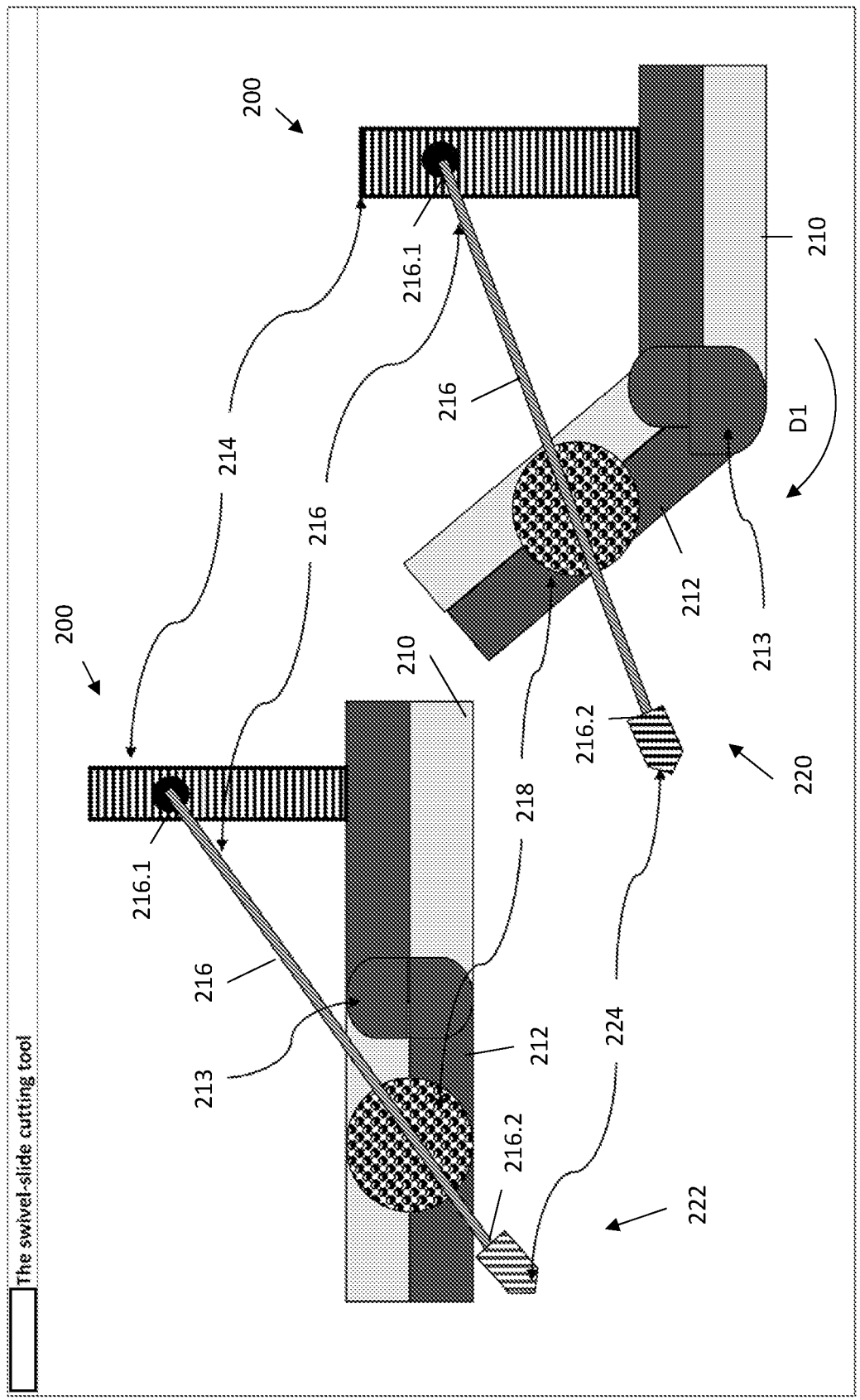
FIG. 5 is a diagrammatic representation of a close-up view of exemplary articulated elements of the band of elements showing a first element and an adjacent second element which are hingedly connected to one another.

In embodiments of the invention there is provided an earth cutting system (100) shown in FIGS. 1 to 4, 8 and 12; and an earth cutting apparatus (200) shown in FIGS. 4 to 7 and 9 to 11. Referring to FIG. 5, the earth cutting apparatus (200) includes a plurality of articulated elements (210, 212) including at least a first element (210) having a mounting structure (214) or anchoring pillar thereon and an adjacent second element (212) hingedly connected (213) to the first element. An earth cutting member (216) is provided and includes a proximal end (216.1) which is pivotally mounted to or held by the mounting structure (214) of the first element (210) and an earth cutting end (216.2). The earth cutting member (216) is slidably connected (218) to the adjacent second element (212) and moveable between an extended position (220) and a retracted position (222). Hinged movement of the adjacent second element (212) relative to the first element (210) (in the direction of first directional arrow D1) causes the earth cutting member (216) to slidably extend (220) from the adjacent second element (212) to the extended position for operatively cutting earth. Hinged movement of the adjacent second element (212) in an opposite direction (opposite to arrow D1) causes the earth cutting member (216) to slidably retract to the retracted position (222). The earth cutting apparatus (200) may also be referred to as a swivel-slide cutting tool. A shaft of the earth cutting member (216) may be configured to slide in a swivel (218) provided in the adjacent second element (212).

The adjacent second element (212) includes the swivel (218) wherein the earth cutting member (216) is slidably mounted. This slideable connection between the earth cutting member (216) and the adjacent second element (212) (and the swivel (218)) may also be configured to clean the earth cutting member (216) as it moves between its extended (220) and retracted (222) positions. The earth cutting apparatus (200) is configured such that hinged movement (D1) of the first and second elements (210, 212) causes reciprocating movement (226) (shown in FIG. 10) of the earth cutting member. The reciprocating movement (226) is caused when the first and second elements move around an idler wheel (112) of the earth cutting system (100) as is discussed in more detail below.

Figure 1:
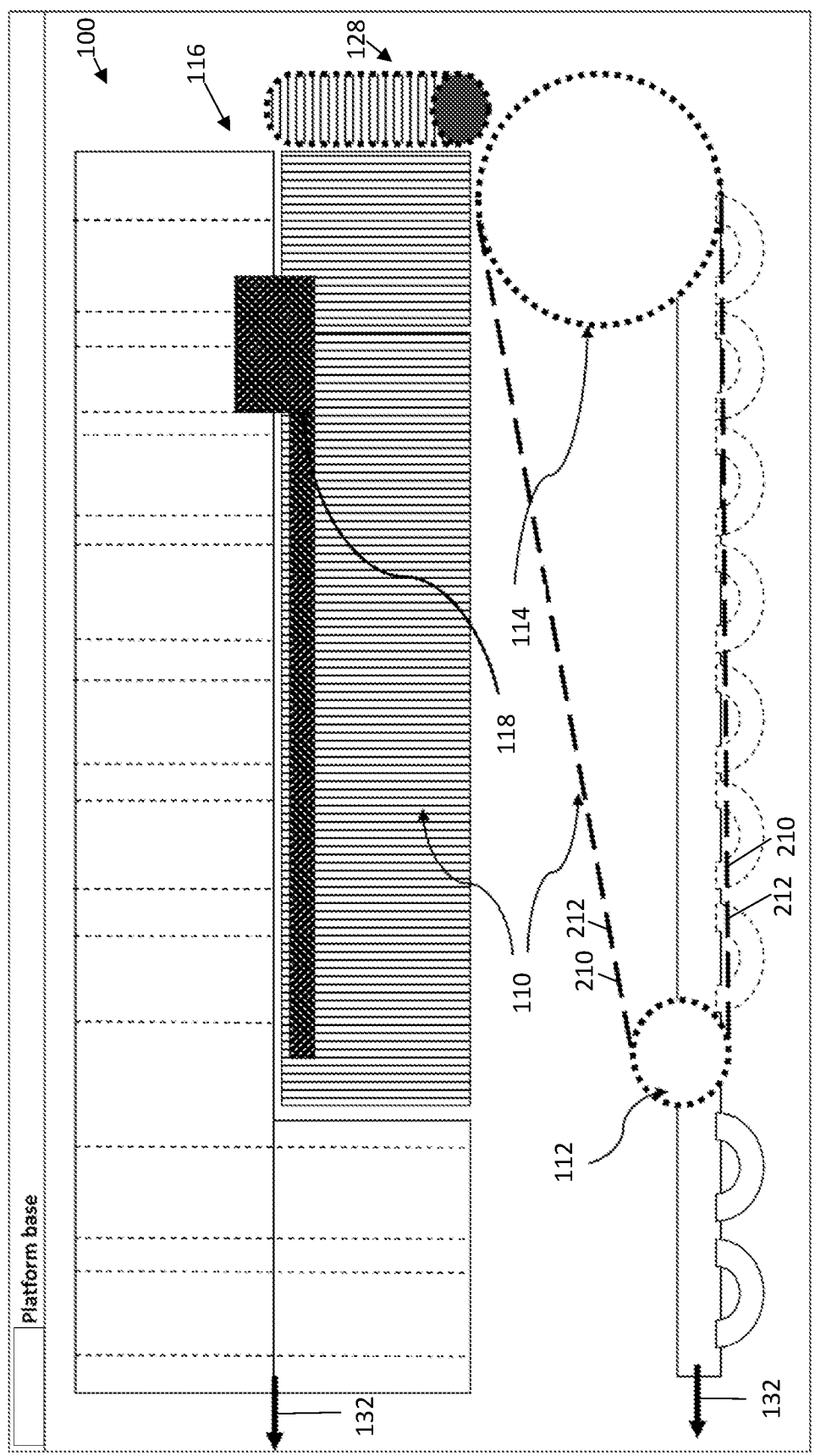
FIG. 1 is a diagrammatic representation showing a side and top view of an exemplary earth cutting system including a band of elements which are provided around a driver wheel and an idler wheel.
Figure 2:
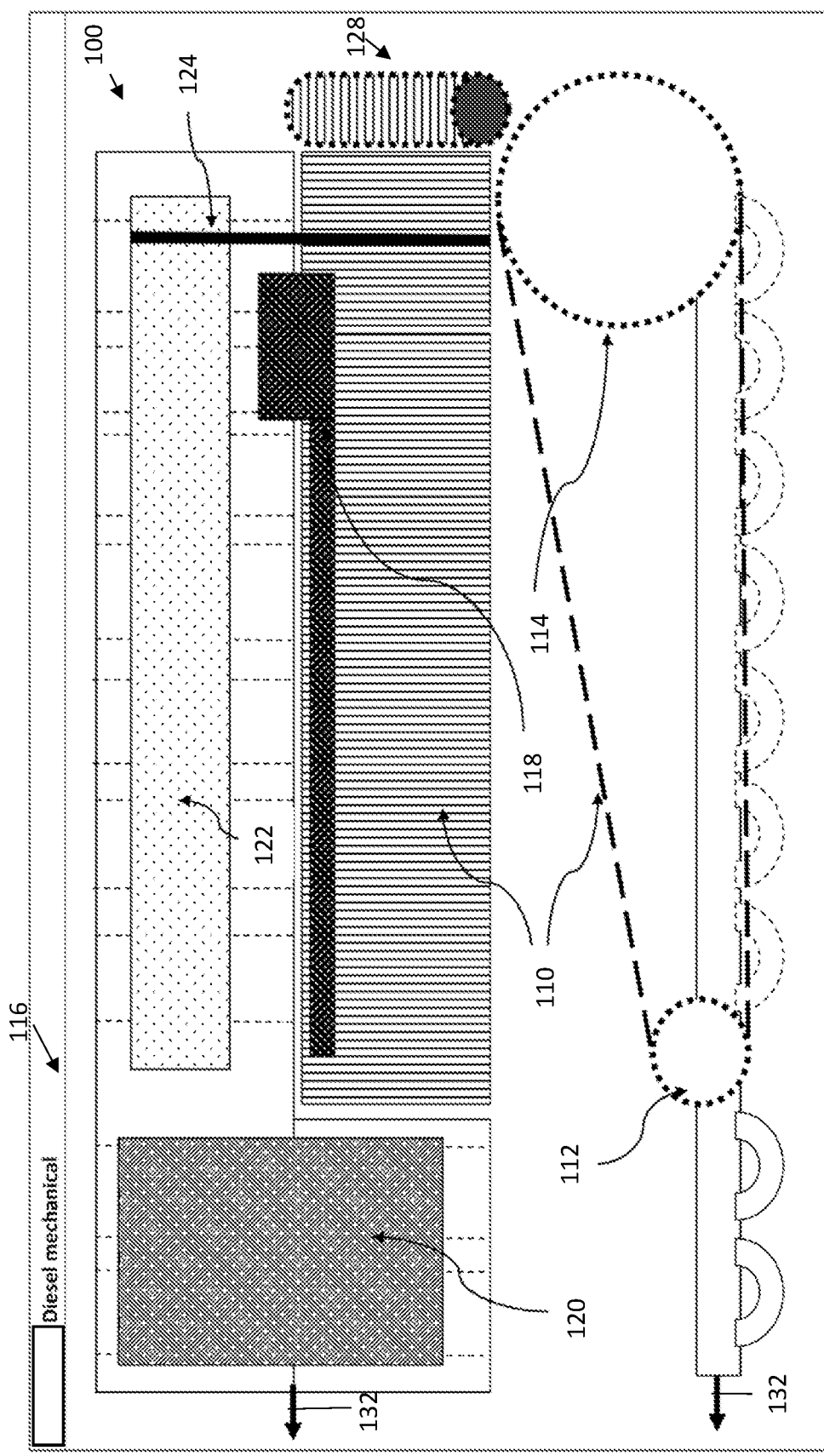
FIG. 2 is a diagrammatic representation showing a side and top view of an exemplary earth working machine incorporating the earth cutting system and providing power thereto using a power source.

Referring to FIGS. 1 to 3, the first and second elements (210, 212) are, in the example embodiment, in the form of articulated plates that form part of an articulated band (110) of plates or elements having a plurality of first and second elements (210, 212) arranged adjacent one another. In FIGS. 1 to 3, diagrammatical representations of side and top views are shown of the earth cutting system (100). The articulated band (110) is provided around an idler wheel (112) and a driver wheel (114) for rotating the band (110) of elements in use. A plurality of earth cutting members (216) are provided on the band (110) of elements, and the earth cutting members (216) are configured to move between their extended (220) and retracted (222) positions as the band (110) of elements moves around the driver and idler wheels (114, 112) in use. The earth cutting system (100) may be provided on a platform of an earth working machine (116) or vehicle. The earth cutting apparatus (200) may be referred to as a working tool set which is provided on a chain of plates or plate-chain. The driver wheel (114) has a smaller diameter or radius than the idler wheel (112). An adjustable support, in the example embodiment in the form of a hydraulic system (118), is provided for lifting or raising and lowering the articulated band (110) into and out of the earth to vary a working depth thereof, and also forcing it into the earth when the earth is being cut or worked. The idler wheel (and/or an idler wheel rotating assembly) may be forced downward into and lifted from the soil with a hydraulically or mechanically powered ram which may also include a shock-absorbing accumulator.

FIG. 5 also shows a slipping hinge mechanism (213) of the overlapping elements (210, 212) or grouser plates, allowing the band of elements (110) or plate-chain to turn around the drive and idler wheels (114, 112). In the example embodiment, the diameter of the idler wheel (112) is not more than 80% of the diameter of the driver wheel (114). For example, the driver wheel of the earth cutting system (100) may have a diameter of 1 000 mm, while the idler wheel will have a diameter of less than 800 mm. Hence, a diameter ratio of at least 5:4 should preferably be provided between driver wheel (114) and idler wheel (112).

Figure 7:
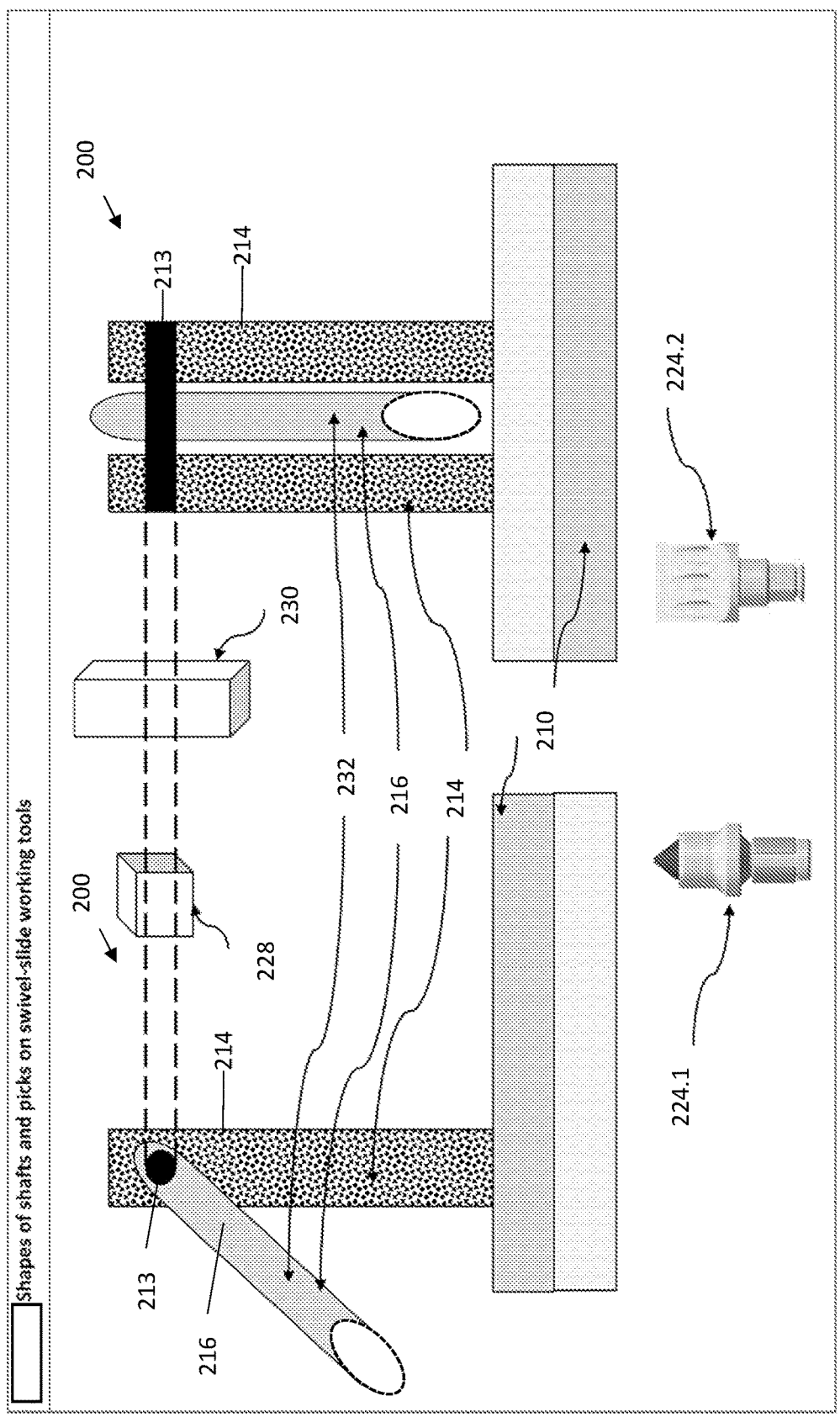
FIG. 7 is a diagrammatic representation of a close-up side view and a close-up front view of a mounting structure provided on the first element and shows exemplary earth cutting bits mountable to earth cutting members.

The earth cutting member (216) is configured to receive an earth cutting bit (224) which is preferably removably mountable to the earth cutting member (216) at the earth engaging end (216.2) thereof. As is shown in FIG. 7, the earth cutting bit (224) may be in the form of a conical (224.1) or flat (224.2) bit for engaging and cutting the earth as the band (110) of elements is rotated. Rotation of the band of elements (110) of the earth cutting system (100) (also referred to as a primary, two-wheeled linked plate-chain system) uses a principle of rotational-penetration for working the soil. A shaft of the earth cutting member (216) is fixed to the first element (210) with an anchoring pillar sub-assembly (214) and fitted with an anchoring axle (213) allowing for a hinge movement as the elements (210, 212) turn around their hinge connection with rotation of the band of elements of the system (100). The shaft of the earth cutting member is shown cut away (in broken lines) in FIG. 7 for illustrative purposes. The earth cutting member or swivel-slide cutting tool may include the removable earth cutting bit (224) (also referred to as a removable forward working part) and a rear holding shaft part fixed to the pillar (214) which may be referred to as a pillar-anchor-hinge sub-assembly. These pillars are mounted on the inside of the first element (210). The earth cutting member may also include a connecting sub-assembly between the forward working part and the rear holding shaft part. The connecting sub-assembly may include a shock absorbing part. The working part or earth cutting bit (224) can be turned around or removed and replaced when worn.

As is shown in FIGS. 2 and 3, the earth cutting system (100) is in the exemplary embodiment powered by a power source (120) which may for example be a diesel engine mounted on the vehicle (116). Other power sources (or power supply units) such as diesel-electric or diesel-mechanical systems, diesel generators (sometimes referred to as a Genset), petrol engines or generators, electric motors, hybrid systems or drives may also be used. For example in FIG. 3 there is shown the diesel engine (120) which is used to generate electricity for powering one or more electric motors (126). A torque converting system (122) is provided and one or more drive shafts (124) for driving the driver wheel (114). One or more sprockets may be used to drive the driver wheel (114). The power supply unit (120) is configured to turn sprockets intermeshing with drive chains on which the band of elements or plate-chain is mounted. The band of elements may be fixed to the one or more drive chains rotating around the driver wheel and idler wheel. The band of elements (e.g. grouser plates) interlink with each other through a slipping or sliding hinge mechanism (213) as shown in FIG. 5.

Figure 8:
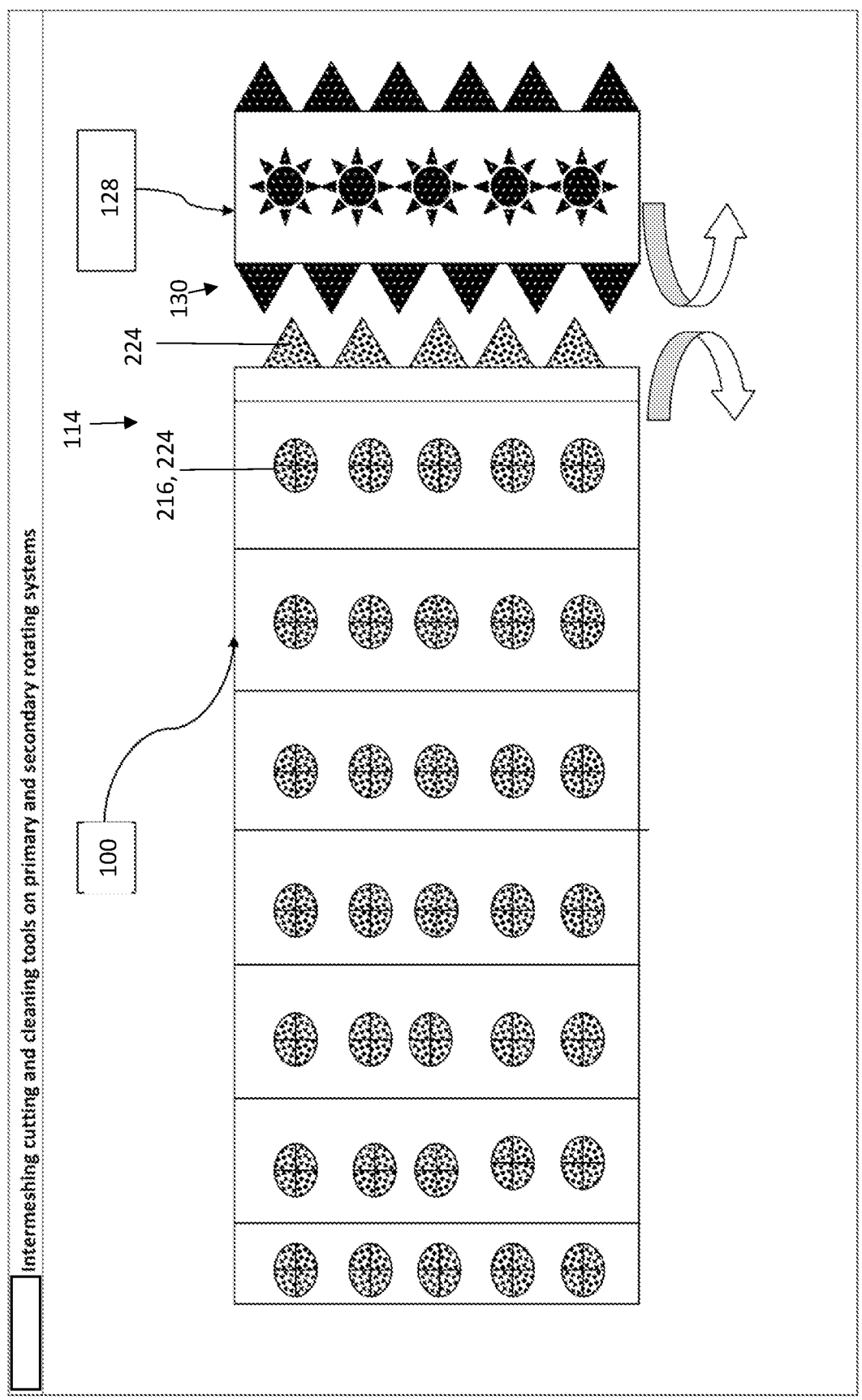
FIG. 8 is a diagrammatic representation showing a top view of the exemplary earth cutting system and a secondary drum including teeth, paddles and brushes that are operatively interposed between the earth cutting members.
Figure 12:
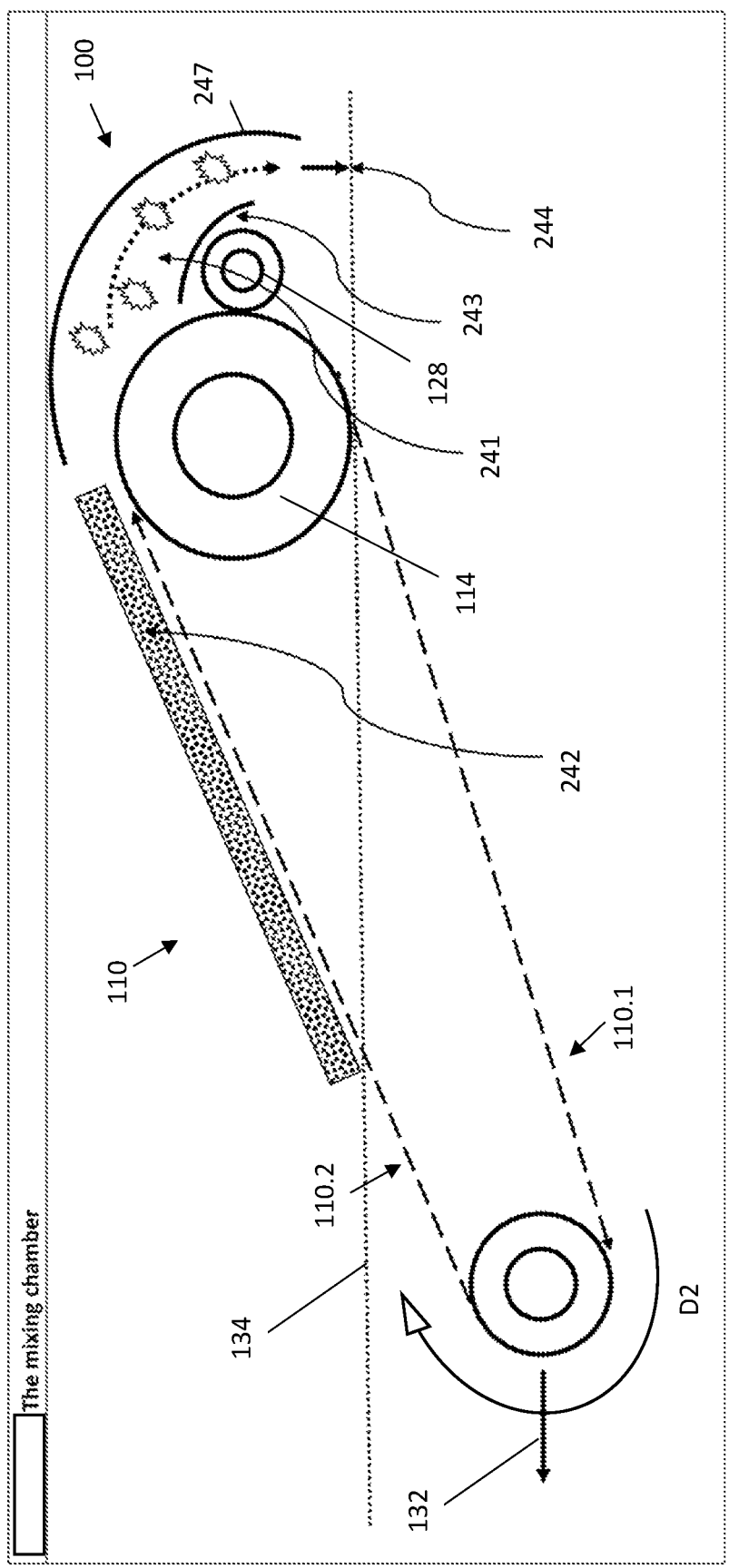
FIG. 12 is a diagrammatic representation of a side view of the earth cutting system showing the band of elements being used on a surface of earth.

As is more evident from FIGS. 8 and 12, in the example embodiment, the system (100) includes a secondary drum (128) or a secondary wheel adjacent the driver wheel (114). The secondary drum is rotatable in the same or in an opposite direction than the driver wheel (114). A plurality of teeth or projections (130) or paddles or brushes are provided on the secondary drum (128). These projections are arranged to interpose the earth cutting members (216) in use, thereby facilitating cleaning of the earth cutting members (216) and/or their earth cutting bits (224). The secondary drum is smaller than the driver wheel (114), preferably having a radius which may be in the range of 20% to 40% of that of the driver wheel (114). The secondary drum (128) is configured to rotate at an effective speed of at least twice that of the driver wheel (114), the effective speed being measured at an outer edge of the driver wheel or the secondary drum (i.e. a tangent speed thereof). The hydraulic system (118) may also be used to vary the integration or interaction or the distance between the driver wheel (114) and the secondary drum (128). FIG. 8 shows a top view of the counter-rotating earth cutting system (100) which may be referred to as a primary system, and the secondary drum (128) with intermeshing projections (130) picks, cutting tools, paddles and brushes may be referred to as a secondary system. The secondary system may also be rotated by the power source (120) (or power supply unit) and the paddles or brushes or projections of the secondary system may be used to clean the system (100) and to facilitate the introduction of beneficial materials into the soil being worked. The secondary drum (or secondary rotating system) may be a cylindrical wheel or drum mounted at a top end of the earth cutting system (100). A diameter ratio between the secondary drum (128) and the driver wheel (114) may be less than 1:4. The secondary drum (128) may preferably be rotated in an opposite direction than the driver wheel (114). The rotating band (110) of elements or plate chain carries the soil mixtures to the top of the primary rotating system where it empties into a mixing chamber (214) whereafter it is deposited back into the soil. Counter-rotating action of the secondary rotating drum, within the mixing chamber may be used to injects beneficial materials carried to the top of primary rotating system downward into the void in the soil created by the forward movement of the primary rotating system through the soil. An additional primary and secondary rotating system could be mounted on the movable platform or vehicle (116) but parallel to the first primary and secondary rotating system with at least 1 meter space in-between the two rotating systems wherein the appropriate power supply units and other essential equipment will be mounted.

The vehicle (116) is configured for cutting or tilling earth in a tilling direction (132) by pushing the idler wheel into the earth (as shown in FIG. 12), thereby causing the earth cutting members (216) and their earth cutting bits (224) to cut and/or pierce the earth. The band (110) of elements is rotatable with a first portion (110.1) of the band moving toward the tilling direction (132) and a second portion (110.2) of the band moving in a direction away from the tilling direction (132). The first portion (110.1) of the band (110) which is moving toward the tilling direction (132) is preferably a lower portion of the band (110). The band is arranged to cut or till the earth below a surface (134) of the earth when the earth cutting members (216) are moving around the idler wheel (112) in an upward direction as is indicated by second directional arrow (D2). The earth cutting members (216) and/or their earth cutting bits (224) are self-sharpening such that rotation of the idler wheel (112) causes the earth cutting bits (224) to be sharpened as they cut through earth. The earth cutting members (216) are configured to perform an upward cutting action on the earth. FIG. 12 also shows a mixing chamber (241) where the soil may be mixed with beneficial materials transported up the plate-chain including the possible injection (242) of liquids. A shield (243) may be provided for covering the secondary drum or wheel (128). The mixture of earth and other materials is then deposited (244) back into the soil. The rotating elements of the system (100) (also referred to as a primary plate-chain rotating system) may first be cleaned by a scraper plate (247) mounted close to the plate-chain and able to scrape the surface between the moving earth cutting members, picks or swivel-slide cutting tools. The shield (243) may also function as a scraper plate.

Figure 9:
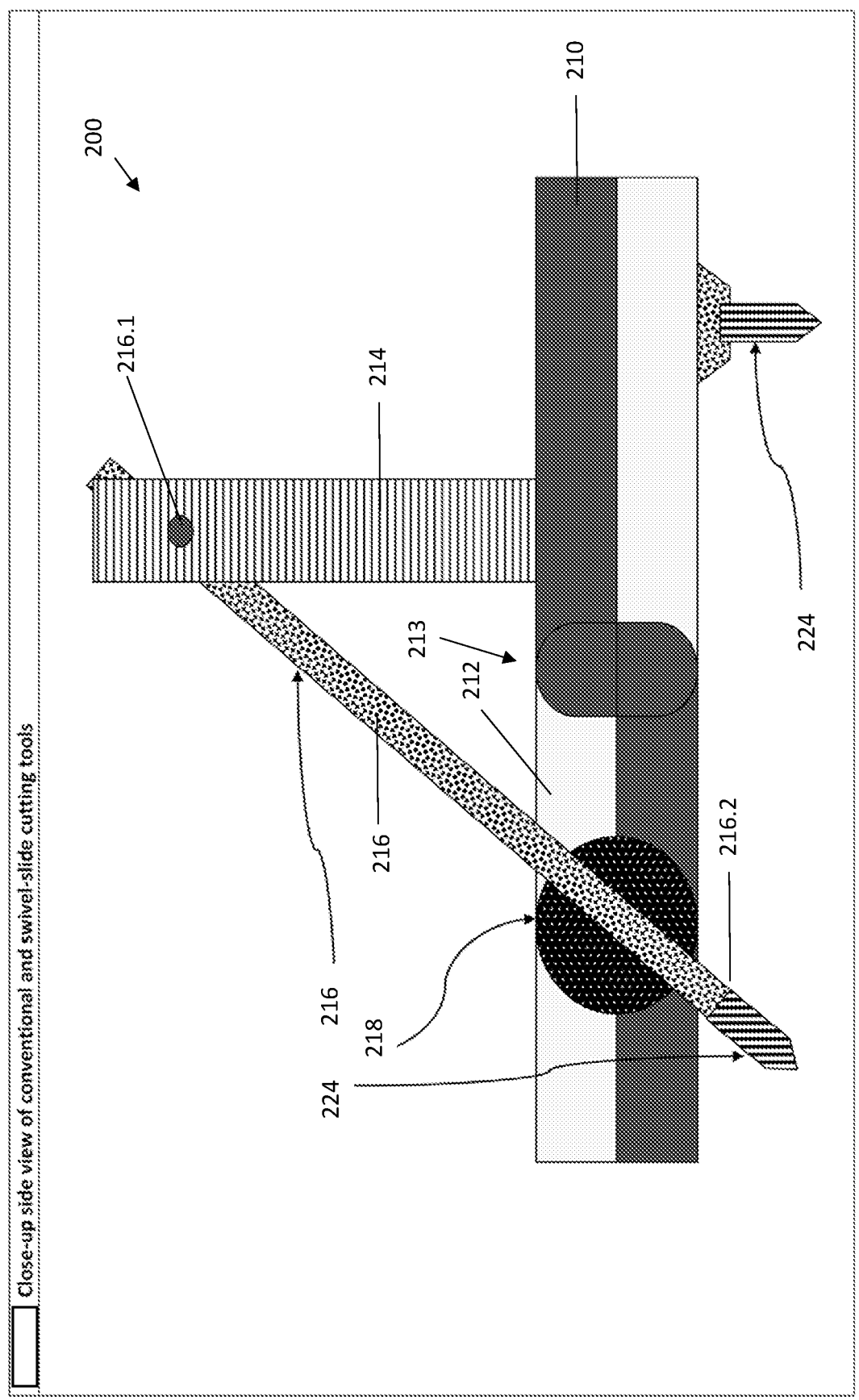
FIG. 9 is a diagrammatic representation of a close-up side view showing exemplary first and second elements provided with a combination of a reciprocating earth cutting member and an earth cutting member that is directly mounted to one of the elements.

In FIG. 4 is shown the earth cutting system (100) in more detail. The earth cutting members (216) are configured to receive the earth cutting bits (224.1, 224.2) which are removably mountable to the earth cutting member (216) at the earth engaging end (216.2) thereof. The system (100) may optionally also include a plurality of earth cutting bits (224) mounted directly to one or more of the elements (also referred to as conventional earth cutting bits), preferably to the first element (210) as is illustrated in FIG. 9. FIG. 4 illustrates the example embodiment of the system where both the earth cutting apparatus (200) and the directly mounted earth cutting bits (224) are used on the band (110) of elements. The driver wheel (114) has a larger diameter than that of the idler wheel (112). The idler wheel (112) may be cylindrical, five-sided or six-sided. At least one beam (136) anchors or stabilises the driver wheel and the idler wheel of the system (100). The beam may also incorporate appropriate shock absorbing sub-assemblies. The at least one beam may form part of a structural frame of the system.

The earth cutting member (216) is moveable between a retracted position and an extended position, such that when the band (110) is rotated, the earth cutting member (216) moves to its extended position when it is at a first location (255) relative to the idler wheel for operatively cutting earth, and moves to its retracted position when it is at a second location (265) relative to the idler wheel (112). It should be appreciated that the mounting structure (214) may be provided on the second element (or the sliding connection and the mounting structure may be provided on one of the elements with the earth cutting member extending through that same element) and the earth cutting member may be moved between its extended and retracted positions by another moving apparatus (such as an actuator, e.g. a hydraulic or pneumatic or mechanical or electrical actuator, or a spring, or a cam surface, etc.)(even though these embodiments are not shown, it is envisaged that they may be possible). In such an embodiment, the proximal end (216.1) need not be pivotally mounted to the mounting structure (214), but the earth moving member (216) may be slidably mounted in one of the elements (201, 212) to extend therefrom and to retract back to its retracted position under influence of the moving apparatus at preselected locations around the idler and driver wheels. The earth cutting member (216) may extend and retract at substantially right angles relative to the band of elements, or may extend and retract at an angle relative to the band of elements.

The smaller diameter of the idler wheel, compared to the driver wheel, facilitates cutting angles into the soil of the earth cutting apparatus (200) when cutting through the soil or earth as well as the deeper penetration of the earth cutting bits (224) or pick tips into the soil. A mass of the rotating band (110) of elements may be concentrated on a perimeter of the driver wheel which may enable the driver wheel (114) to act as a flywheel which retains at least a portion of its rotational motion and this may facilitate power transfer to the idler wheel (112). The entire band of elements also has a substantial portion of its weight distributed towards an outer periphery of the band of elements, which may enable the band of elements to function as a flywheel to facilitate deep earth cutting.

Figure 6:
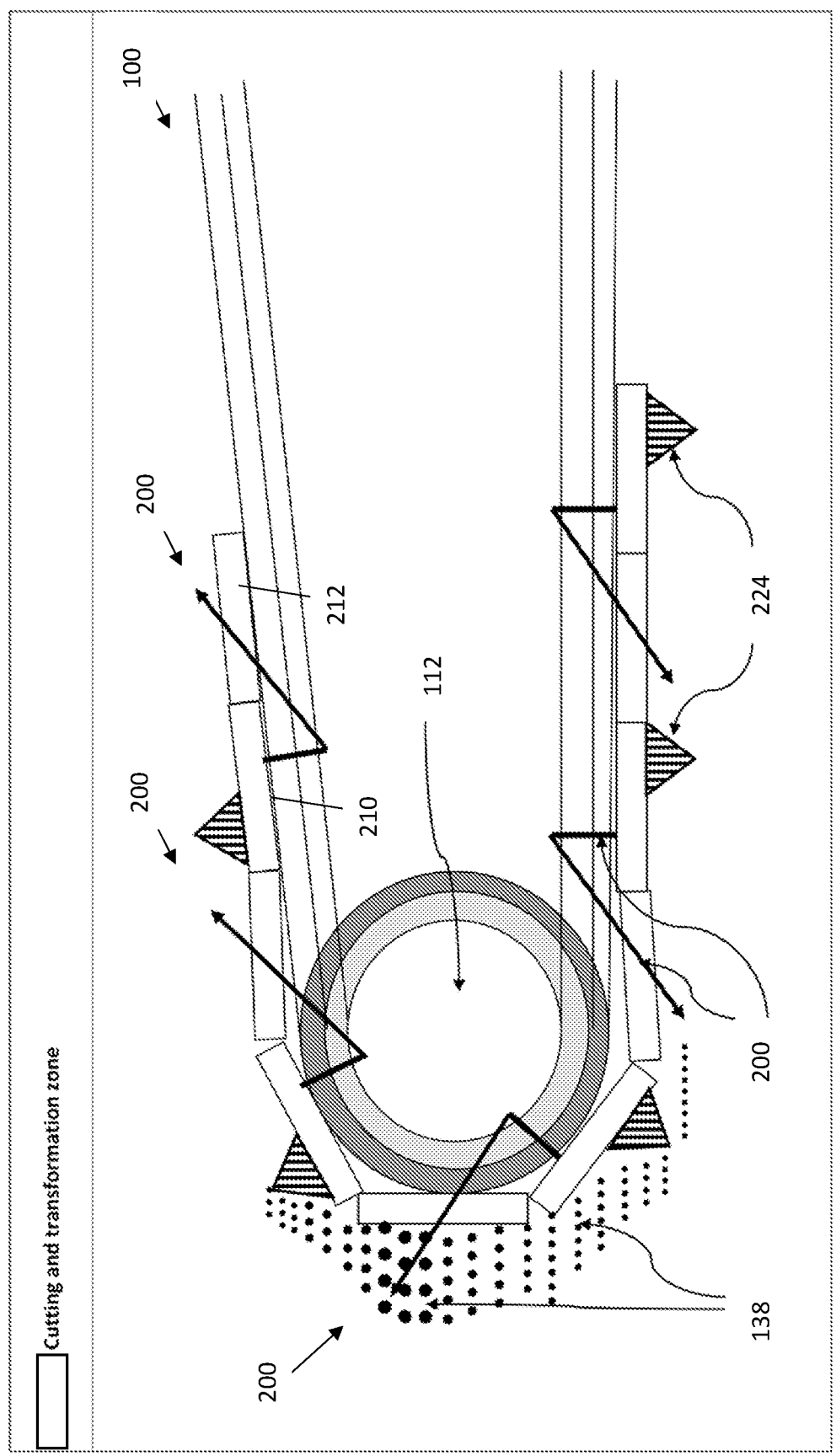
FIG. 6 is a diagrammatic representation of a close-up side view of the idler wheel showing rotation of the band of elements and illustrating the operation of the earth cutting members.

Referring to FIG. 6, when the earth cutting system (100) and earth cutting apparatus (200) is used to cut earth, the earth cutting members (216) of the earth cutting apparatus (200) (and optionally also the directly mounted earth cutting bits (224)) turn around the idler wheel (112) in an up-cutting motion and thereby create a cutting and transformation zone (138) in front of the idler wheel (112). This up-cut motion may also force the idler wheel (and/or an idler wheel assembly) downward into the earth and hold it in the soil while working the soil. The upwards movement of the earth cutting members (216) and their earth cutting bits through the soil around the idler wheel may result in sharpening or self-sharpening of the earth cutting bits (224) as the tips of the earth cutting bits or picks move through the soil upward and at an angle. Embodiments are possible wherein the earth cutting bit is integral to the earth cutting member. In the cutting and transformation zone (138), the soil or earth is effectively lifted, fluidized and suspended as a result of the energy transferred and work done by the cutting tools into the soil, driven by torque applied on the driver wheel on the band (110) of elements (210, 212). The system (100) may be configured to operate at relatively high revolutions per minute maintained by the idler wheel.

In FIG. 7 is shown a close-up view of the earth cutting apparatus (200) or swivel-slide cutting tools. The mounting structure (214) or anchoring support is provided and includes a pillar for mounting the shaft of the earth cutting member (216) to the first element (210). As is illustrated, the shaft of the earth cutting member (216) could be square (228), rectangular (230) or round (232) in cross section, to which picks or earth cutting bits of various shapes, including conical (224.1) and flat (224.2) could be fixed. The shaft of the earth cutting member may for example be between 10 mm and 70 mm. The soil-cutting picks or soil cutting bits (224.1, 224.2) fitted to the ground penetrating end or earth cutting end (216.2) of the shaft or shank of the earth cutting member (216) may be round or conical or rectangular or flat.

Figure 10:
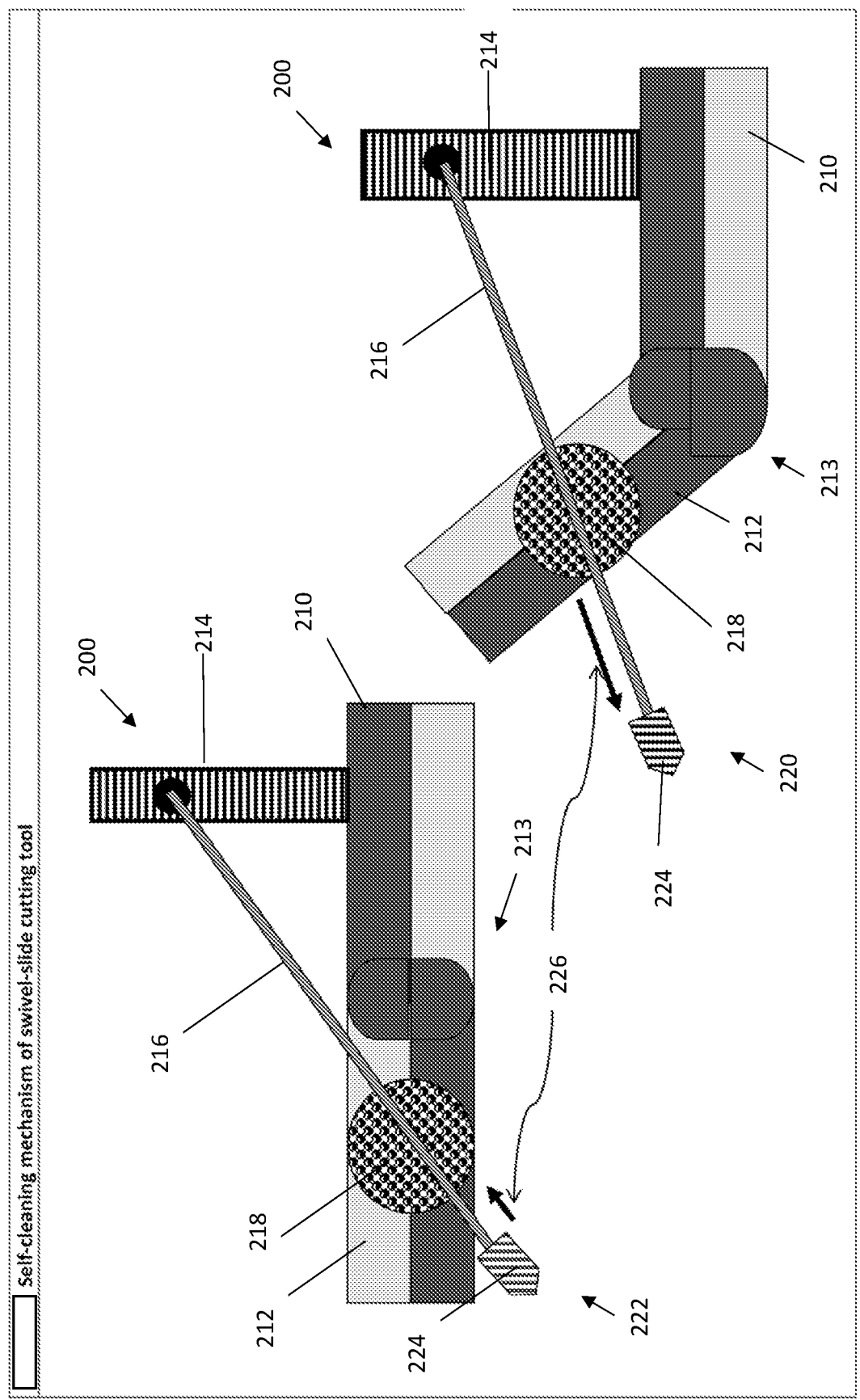
FIG. 10 is a diagrammatic representation of a close-up side view showing the exemplary reciprocating earth cutting member and illustrating a self-cleaning ability thereof, as the earth cutting element slidably penetrates or extends into and withdraws or retracts from the earth.

FIG. 10 shows hinged movement of the first and second elements (210, 212) with the corresponding reciprocating movement (226) of the earth cutting member (216). This reciprocating movement is in the example embodiment caused when the first and second elements (210, 212) move around the idler wheel (112) or the driver wheel (114). As shown, the adjacent second element (212) includes the swivel (218) whereto the earth cutting member is slidably mounted. The swivel (218) or the slideable connection is configured to clean the earth cutting member (216) as it moves between its extended and retracted positions (220, 222) (when it penetrates into and withdraws from the soil). There is hence provided a self-cleaning mechanism function as the forward penetrating and backward retracting movement of the swivel-slide earth cutting members (216) move through the swivel (218) (or swivel sub-assembly) in the rotating element (212). It will be appreciated that instead of the swivel (218), the earth cutting member may simply slide in an aperture provided in the second element (212) which may also provide this cleaning function. The cleaning of the earth cutting members (216) is achieved by sliding movement of the earth cutting members through the swivel sub-assemblies and results in the soil which may be adhered to the earth cutting members being scraped off and returned to the soil. The swivel sub-assemblies may be made of high wear resistant materials. Adhered soil is moved away from the earth cutting member (216) by upward movement around the idler wheel as it moves through the soil.

Figure 11:
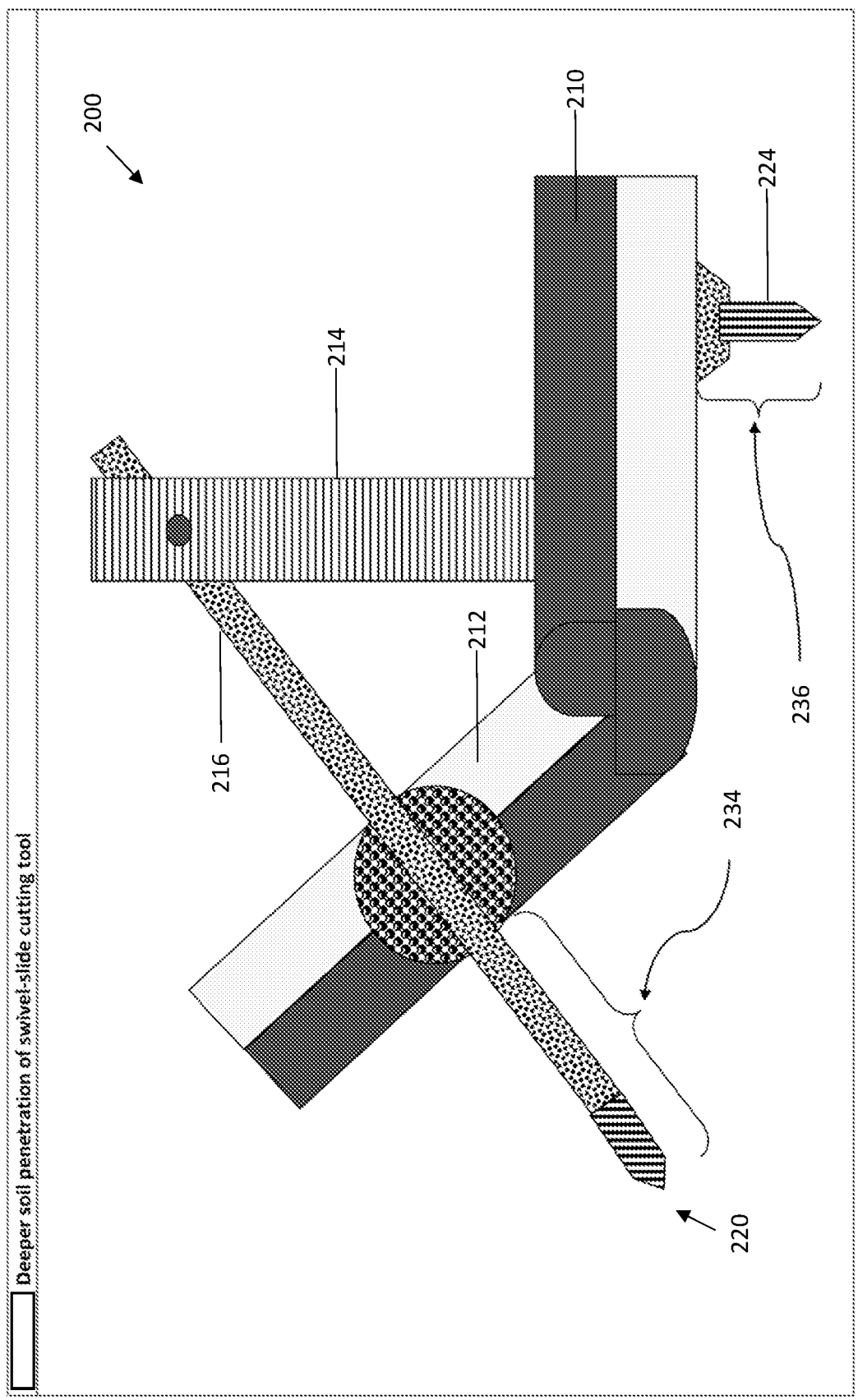
FIG. 11 is a diagrammatic representation of a close-up side view showing deeper penetration into the earth or soil of the reciprocating earth cutting members, compared to picks or other earth cutting members mounted directly onto one of the elements when turning around the idler wheel.

FIG. 11 is similar to FIG. 9, but shows the earth cutting member in its extended position (220). In the extended position, the earth cutting member (216) extends a first distance (234) from the second element (212), which first distance (234) is greater than a second distance (236) that the directly mounted earth cutting bit (224) extends from the first element (210). This may provide increased earth penetration and cutting. In use, the shaft of the earth cutting member (216) penetrates forward and retracts backward through a swivel sub-assembly that is fixed onto the adjacent second element (212) allowing for the pick or earth cutting bit (224) on the shaft to penetrate into and retract from the soil. The swivel-slide cutting tool or earth cutting member (216) may hence penetrate at various depths depending on an angle of the first and second elements (210, 212) (grouser plates) and their hinges (213) when moving through the rotating motion of the system (100). This penetrating depth may vary between 10 mm and 200 mm depending on the position of the grouser plates around the idler wheel and between 10 mm and 100 mm depending on the position of the grouser plates around the driver wheel.

Figure 13:
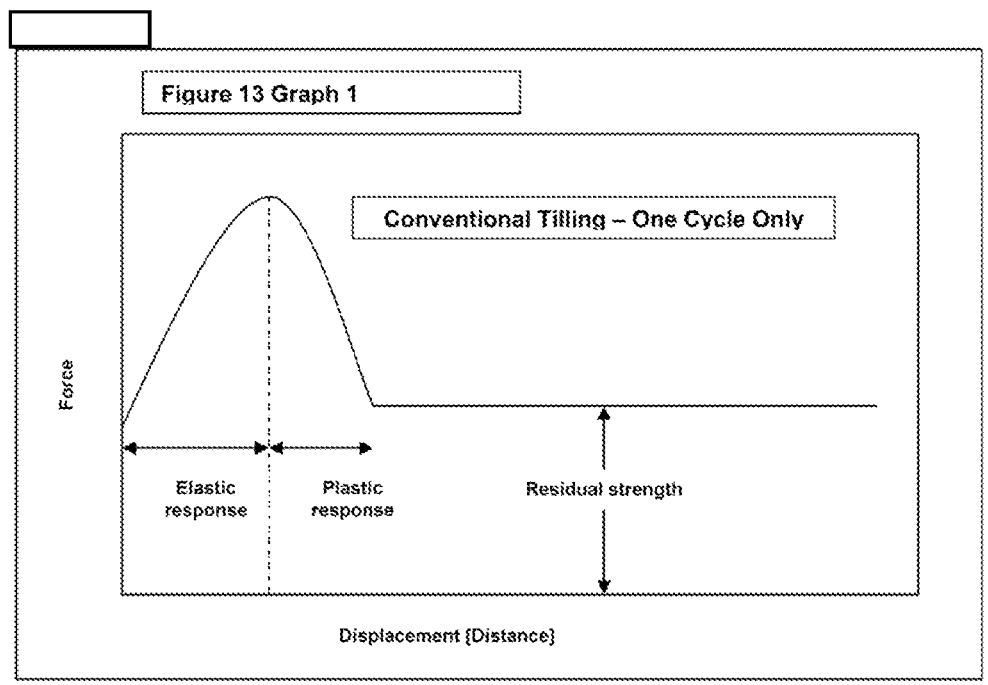
FIG. 13 shows two graphs that illustrate an effect on soil using conventional tilling and using continuous deep earth working with the earth cutting system of the present invention.
Figure 13:
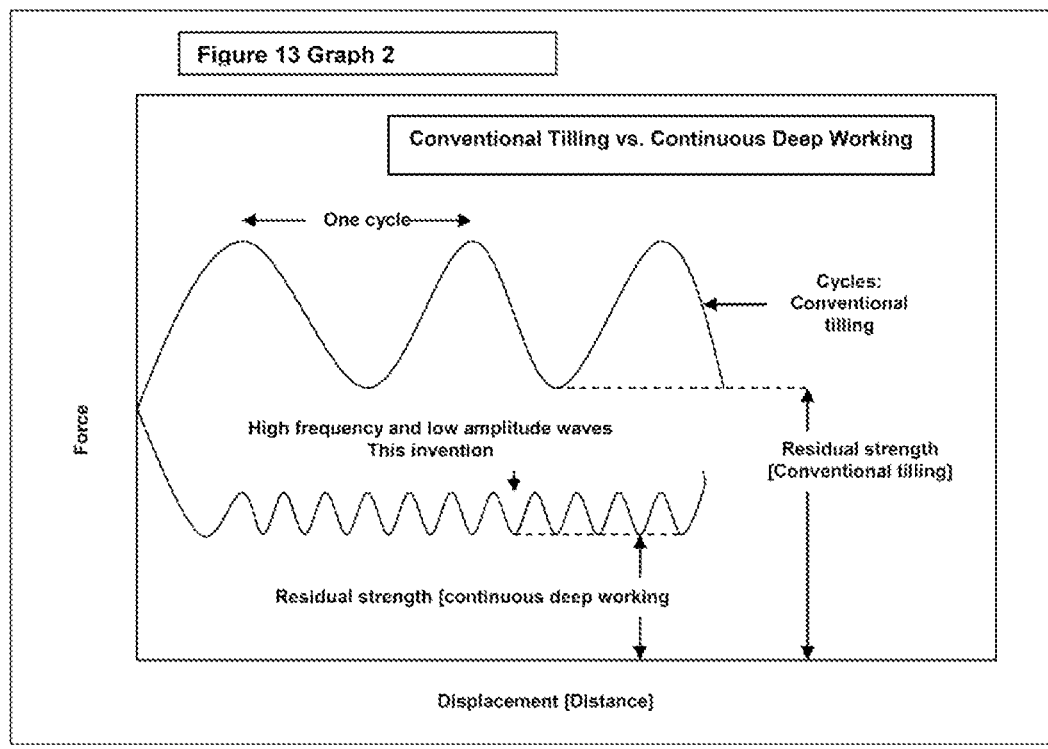
Figure 14:
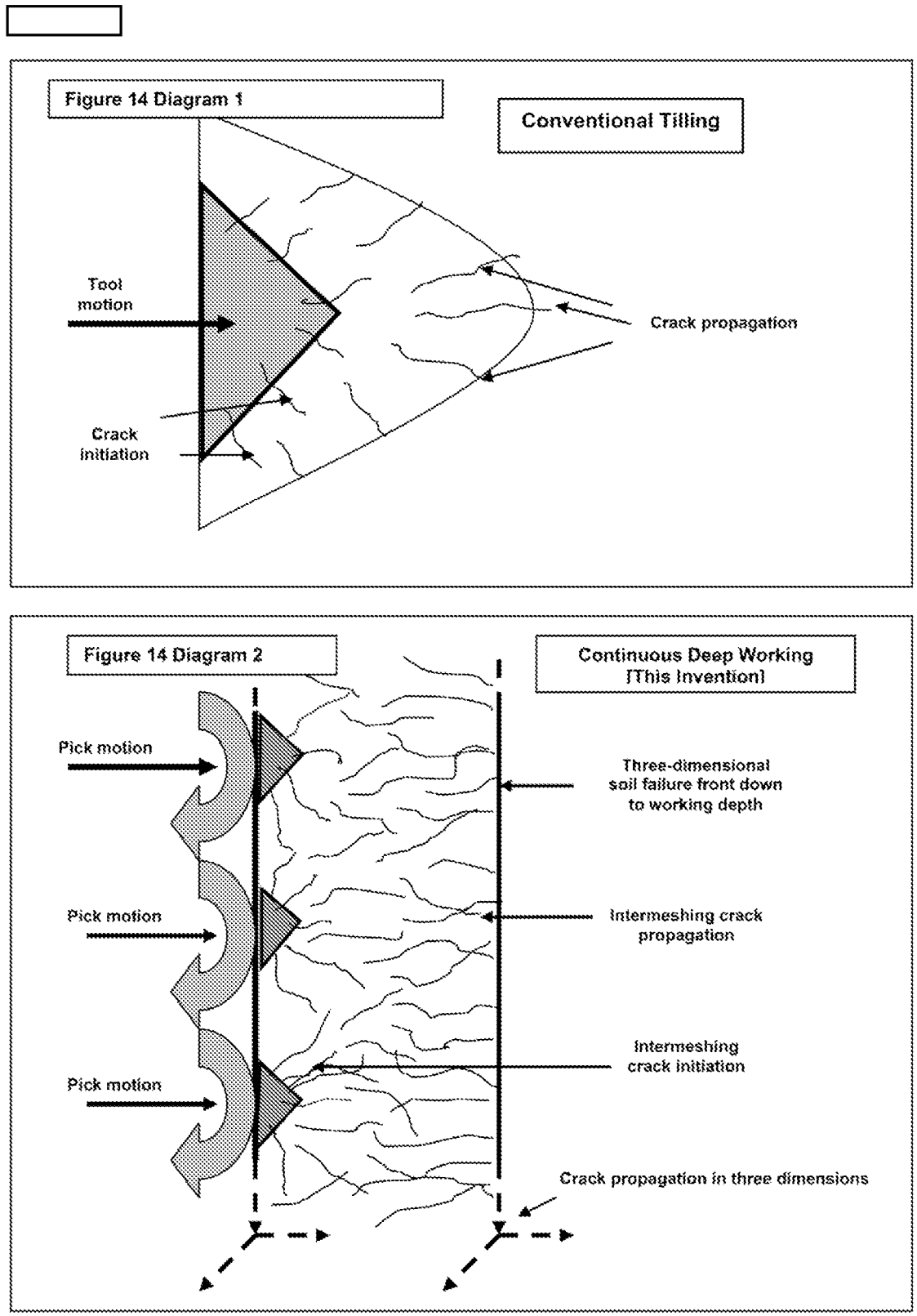
FIG. 14 shows two diagrams that illustrate an effect on soil utilising continuous deep working thereof using the present invention.

FIG. 13 show self-explanatory graphs of conventional Tilling and Soil Deep Working (SDW) (or continuous Deep Working) using the system, apparatus and method of the present invention, whereby the residual strength of the earth is lower than with conventional tilling. FIG. 14 show self-explanatory diagrams of crack propagation using Conventional Tilling and using the system, apparatus and method of the present invention.

It will be appreciated by those skilled in the art that there are many variations to the invention as herein defined and/or described with reference to the accompanying drawings, without departing from the spirit and scope of this disclosure.

Deep working, including the homogeneous mixing of the soil, using working tool sets specially designed for the purpose, as part of a soil deep-working system, is necessary to ameliorate compacted soil profiles often present as layers resulting from past practices such as traffic induced compaction and limited water penetration. Deep working of the soil may, including using specially designed working tool sets as described herein; result in the incorporation of valuable topsoil and surface residues into the subsoil which may provide advantages.

The cutting tools including the directly mounted earth cutting bits and the swivel-slide cutting tools mounted on the primary plate-chain system are of a design which may provide increased efficiency and effectiveness for penetrating into, working and cutting through the soil to the depth the primary plate-chain rotating system will be working. The projections or paddles or brushes mounted on the secondary drum may facilitate effective and efficient removal of earth materials such as soil, rocks or clods stuck between the picks and swivel-slide cutting tools on the primary plate-chain rotating system, accelerating these earth materials in the turn direction of the primary rotating system, through a mixing chamber. Beneficial materials may also be injected or introduced into earth carried by the primary plate-chain rotating system, before re-introduction into the soil. Cut earth may be lifted with the band of elements before mixing a substance or material with the cut earth and then re-depositing the mixture onto a surface of the earth which is being cut or worked. The mixing in the mixing chamber may include injecting or introducing a gas or a liquid or any other material into the cut or worked earth.

The vehicle may be integrated with the earth cutting system or may be a separate traction unit such as a tractor or bulldozer to move the system across the land or earth to be worked as well as providing a platform on which the earth cutting system may be mounted and connected to the traction unit. The traction unit may have at least one motor and the platform may have a power and drive system arranged to operate the primary rotating plate-chain system (the earth cutting system) as well as the secondary drum of the earth cutting system, allowing the primary rotatable plate-chain system with mounted cutting tools to rotate and penetrate into the soil. The earth cutting system and the secondary drum may be mounted on a moveable platform which is moveable on the soil surface using e.g. roller-wheels whereon the power supply units for these rotating systems are also mounted. The traction unit may be integrated or, preferably a separate and independent, traction unit and the earth cutting apparatus and system mounted on the movable platform may be drawn by the traction unit. The traction unit may have at least one motor and a drive train arranged to draw the platform across the land to be worked, and a drive system on the platform, which could either be mechanical or electrical, arranged to operate the earth cutting apparatus.

The earth cutting members, the earth cutting bits and the paddles or brushes on the secondary drum may be removable to be disassembled and so that worn parts of the system may be replaced or maintained. The earth cutting members may be mounted to the band of elements in a way which facilitates removal and re-insertion. The direction of working of both the directly mounted earth cutting bits and the earth cutting bits provided on the moveable earth cutting members may facilitate and/or work in concert with an up-cut mode of the system. A down-cut mode, although technically feasible, may be considered to be uneconomical. However, embodiments may be possible wherein down-cut modes are used. The number and configuration of directly mounted earth cutting bits and/or the number of earth cutting apparatuses with the swivel-slide connection as well as the number of paddles or brushes on the secondary drum can also be varied depending on the work to be done on the soil. The direction of rotation of the primary rotating system and secondary drum, may result in the paddles and brushes on the secondary drum to pass through the space between the directly mounted earth cutting bits and/or the space between the earth cutting members of the earth cutting apparatus that are provided on the primary plate-chain rotating system.

The band of elements or primary rotating system may effectively form an elongated drum. The shape of an idler wheel sub-assembly may be a circular or a five sided or a six sided rotating sub-assembly with appropriate sprockets intermeshing with a drive chain of the plate-chain. Both the driver wheel and the idler wheel may comprise a sub-assembly of parts. The distance between an axis of the rotating driver wheel and the rotating idler wheel may be less than 2 000 mm, alternatively less than 4 000 mm. The band of elements (or grouser plates) may be at least 300 mm, but preferably 600 mm in length and at least 200 mm in width. Their width may be measured in the tilling direction in use, but other arrangements are possible. The driver wheel and secondary drum may be provided close enough to one another to facilitate intermeshing of the projections of the secondary drum and the earth cutting members or their earth cutting bits. The primary and secondary systems may be operated in counter rotation or, alternatively, in co-rotation while moving across land in a direction transverse to an axis of the driving wheel and an axis of the idler wheel (which axes may be parallel to one another), so that the primary system engages soil to cut and lift it, whereas the secondary system engages the lifted soil to assist in mixing thereof, such operation taking place within the mixing chamber, whereafter the soil is then re-deposited.

The grouser plate-chain or the band of elements with the directly mounted earth cutting bits and the earth cutting apparatus mounted thereon and therein, may accelerate when rotating around the narrower diameter idler wheel assembly which may facilitate earth cutting. The overlapping grouser plates connected with the slipping hinge mechanism may also absorb shock when the plate-chain system rotates through the soil.

The inputs required to operate the working tool set for an earth deep working apparatus, as described herein, and the outputs delivered thereby, may be monitored by and controlled by an on-board computerised management system.

Soil Deep Working (SDW) and the system, apparatus and method disclosed herein may be used, inter alia, in the following implementations:
The preparation of new soil for agricultural, forestry or environmental purposes including the mixing-in of beneficial materials or substances into the soil;
The regeneration of soil which has been or is still being used for agricultural, forestry or environmental purposes including the mixing-in of beneficial materials into the soil;
The rehabilitation of soils which have been used in the past for agricultural, forestry or other purposes, such as mining, and have to be physically rehabilitated to be put to use for agricultural, forestry or environmental purposes. In the case of rehabilitating the soil the aim will often be to penetrate the soil deeper than required for purely agricultural purposes. Depths of more than 2 metres may be necessary;
The remediation of soils which have been used in the past for agricultural, forestry or other purposes, such as mining, and has to be physically, chemically and biologically remediated to be put to use for agricultural, forestry or environmental purposes such as constructed wetlands. In the case of remediating the soil the aim will often be to penetrate the soil much deeper than required for purely agricultural purposes. Depths of up to 3 metres may be necessary.

The language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon.

Throughout the specification and claims unless the contents requires otherwise the word 'comprise' or variations such as 'comprises' or 'comprising' will be understood to imply the inclusion of a stated integer or group of integers but not the exclusion of any other integer or group of integers.

The invention claimed is:

1. An earth cutting apparatus comprising:
a plurality of articulated elements including at least a first element having a mounting structure thereon and an adjacent second element hingedly connected to the first element; and
an earth cutting member including a proximal end which is pivotally mounted to the mounting structure of the first element and an earth cutting end, the earth cutting member being slidably connected to the adjacent second element and moveable between a retracted position and an extended position, such that hinged movement of the adjacent second element relative to the first element causes the earth cutting member to slidably extend from the adjacent second element to the extended position for operatively cutting earth, and hinged movement of the adjacent second element in an opposite direction causes the earth cutting member to slidably retract to the retracted position.

2. An earth cutting apparatus as claimed in claim 1, wherein the first and second elements form part of an articulated band of elements having a plurality of the first and second elements arranged adjacent one another and wherein the articulated band of elements is provided around an idler wheel and a driver wheel for rotating the band of elements in use.

3. An earth cutting apparatus as claimed in claim 2, wherein a plurality of earth cutting members are provided on the band of elements, and wherein the earth cutting members are configured to move between their extended and retracted positions as the band of elements moves around the driver and idler wheels in use.

4. An earth cutting apparatus as claimed in claim 1, wherein the earth cutting member is configured to receive an earth cutting bit which is removably mountable to the earth cutting member at the earth engaging end thereof.

5. An earth cutting apparatus as claimed in claim 1, wherein the slideable connection between the earth cutting member and the adjacent second element is configured to clean the earth cutting member as it moves between its extended and retracted positions.

6. An earth cutting apparatus as claimed in claim 1, wherein the adjacent second element includes a swivel wherein the earth cutting member is slidably mounted.

7. An earth cutting apparatus as claimed in claim 1, wherein the earth cutting apparatus is configured such that hinged movement of the first and second elements causes reciprocating movement of the earth cutting member.

8. An earth cutting system comprising:
a band of articulated elements including at least a first element and an adjacent second element hingedly connected to the first element, the band of articulated elements being provided around an idler wheel and a driver wheel for rotating the band of elements in use; and
at least one earth cutting member including a proximal end and an earth engaging end, the earth cutting member being slidably connected to one of the first and second elements and moveable between a retracted position and an extended position, such that when the band is rotated, the earth cutting member moves to its extended position when it is at a first location relative to the idler wheel for operatively cutting earth, and moves to its retracted position when it is at a second location relative to the idler wheel.

9. An earth cutting system as claimed in claim 8, wherein the system includes a secondary drum adjacent the driver wheel.

10. An earth cutting system as claimed in claim 9, wherein a plurality of projections are provided on the secondary drum and arranged to interpose the earth cutting members in use, thereby facilitating cleaning of the earth cutting members.

11. An earth cutting system as claimed in claim 8, wherein the system is provided on a vehicle including a power source for driving the driver wheel for cutting or tilling earth in a tilling direction by pushing the idler wheel into the earth, thereby causing the earth cutting members to cut the earth.

12. An earth cutting system as claimed in claim 11, wherein the band of elements are rotatable with a first portion of the band moving toward the tilling direction and a second portion of the band moving in a direction away from the tilling direction, wherein the first portion of the band which is moving toward the tilling direction is a lower portion of the band, and wherein the band is arranged to cut or till the earth when the earth cutting members are moving around the idler wheel in an upward direction.

13. An earth cutting system as claimed in claim 8, wherein the band of elements is configured such that hinged movement of the first and second elements causes reciprocating movement of the earth cutting member.

14. An earth cutting system as claimed in claim 8, wherein the diameter of the idler wheel is less than 80% of the diameter of the driver wheel.

15. An earth cutting method comprising:
rotating a band of articulated elements including at least a first element and an adjacent second element hingedly connected to the first element, the band of articulated elements being provided around an idler wheel and a driver wheel for rotating the band of elements;
utilizing at least one earth cutting member including a proximal end and an earth engaging end, the earth cutting member being slidably connected to one of the first and second elements and moveable between a retracted position and an extended position, such that when the band is rotated, the earth cutting member moves to its extended position when it is at a first location relative to the idler wheel for operatively cutting earth, and moves to its retracted position when it is at a second location relative to the idler wheel; and
cutting earth by utilizing a power source to drive the driver wheel to operatively rotate the band of elements around the idler wheel.

* * * * *